United States Patent [19]
Rice et al.

[11] Patent Number: 5,669,205
[45] Date of Patent: Sep. 23, 1997

[54] PACKING OF PHOTOGRAPHIC FILM

[75] Inventors: Joseph Rice, West Bridgford; Victor Gabbitas, Chilwell, both of United Kingdom

[73] Assignee: Eastman Kodak Company, Rochester, N.Y.

[21] Appl. No.: 644,885

[22] Filed: May 10, 1996

[30] Foreign Application Priority Data

Jun. 21, 1995 [GB] United Kingdom .................. 9512650

[51] Int. Cl.$^6$ .................................................. B65B 63/04
[52] U.S. Cl. ........................ 53/430; 53/118; 53/316; 53/281; 53/471; 53/506; 53/253; 53/473; 53/485; 29/806
[58] Field of Search ............................. 29/806; 53/116, 53/117, 118, 119, 250, 251, 252, 253, 258, 281, 287, 316, 429, 430, 471, 473, 485, 489, 506

[56] References Cited

U.S. PATENT DOCUMENTS

| | | | |
|---|---|---|---|
| 2,805,531 | 9/1957 | Dimond | 53/506 |
| 2,821,823 | 2/1958 | Wahl | 53/316 X |
| 2,942,395 | 6/1960 | Thoren | 53/316 |
| 3,489,186 | 1/1970 | Riker | 53/506 X |
| 3,714,761 | 2/1973 | Herford et al. | 53/118 |
| 3,748,715 | 7/1973 | Hoover et al. | 29/806 X |
| 4,080,711 | 3/1978 | Kawada et al. | 53/118 X |
| 4,115,913 | 9/1978 | Moriya et al. | 53/118 X |
| 4,656,737 | 4/1987 | Shimizu et al. | 29/806 |
| 4,872,300 | 10/1989 | Luke | 53/506 X |
| 4,965,931 | 10/1990 | Suzuki et al. | 29/806 X |
| 5,020,302 | 6/1991 | Buchman et al. | |

*Primary Examiner*—Daniel Moon
*Attorney, Agent, or Firm*—Arthur H. Rosenstein

[57] ABSTRACT

A cartridge of wound-up photographic film has an elongate housing within which the film is received, the housing having an outlet through which the film leader projects. In order to insert the cartridge of film into a cylindrical container it is necessary to wrap the film leader around the housing of the cartridge. A method of inserting the cartridge into the container involves conveying the cartridge into the open end of the container whilst simultaneously rotating the cartridge about its longitudinal axis so that the film leader is brought into engagement with the rim of the open end of the container whilst it is rotating. This causes the film leader automatically to be wrapped around the housing of the cartridge to permit the ready insertion of the cartridge and the film leader into the container. An apparatus for automatically performing the function of inserting the cartridge into the container using this method is also described.

20 Claims, 2 Drawing Sheets

PACKING OF PHOTOGRAPHIC FILM

FIELD OF THE INVENTION

The present invention relates to a method of and apparatus for inserting a cartridge of wound-up photographic film into a container.

BACKGROUND OF THE INVENTION

At the point of sale to end consumers, 35 mm photographic film is commonly supplied in a cylindrical container with a removable, snap-on cap forming a closure at one end of the container. The film itself is provided in the form of a cartridge comprising a spool having end flanges formed of a ferro-magnetic material between which a shaft is supported, the film being wound around the shaft. The cartridge also has a housing or cover which surrounds the wound-up film, the housing having a light-proof slot or outlet through which the free end or "leader" portion of the film projects and through which the film passes as it is unwound from, and wound back into, the cartridge. Assembly of the film cartridge is, of course, undertaken in a dark room. The cylindrical container is designed to receive the cartridge of the film with only a small clearance.

When the film cartridge has been assembled the film leader projects out of the housing of the cartridge. At present the loading of the film cartridge into a cylindrical container or capsule is effected in a white light area in a two-stage operation. The film leader is exposed during this operation. In order to be able to insert the cartridge into the container, it is necessary initially to wrap the film leader around the cartridge housing and then to move the cartridge along its longitudinal axis into the cylindrical container or capsule. This is an inconvenient operation requiring the use of a guide to ensure that the film leader is appropriately guided around the body of the cartridge. In previous proposals this has been effected using apparatus incorporating a ring through which the cartridge of film is initially passed in order to cause the leader to be pushed inwardly towards the body of the cartridge, or apparatus incorporating a "mechanical finger" which moves around the body of the cartridge in order to cause the leader portion of the film to be wrapped therearound. With both of these previous arrangements the repeated use of the ring or the mechanical finger as a guide can eventually result in damage to the leader portion of the film. If the leader is not wrapped appropriately prior to pushing the cartridge into the capsule, then the leader portion of the film is likely to be damaged. The apparatus required in order to perform these tasks is relatively complex and takes up a not insignificant mount of space.

A cap is applied to the open end of the capsule in a subsequent, further operation. This has normally been effected in a quite separate apparatus with the capsules containing the cartridge of film being conveyed to the separate capping apparatus which has, in previous proposals, been combined with, or adjacent to, packaging apparatus which places the capped capsules into a packet or box. The capping apparatus is typically approximately desk-sized.

SUMMARY OF THE INVENTION

The present invention seeks to provide an improved method of and apparatus for inserting a cartridge of wound-up photographic film into a cylindrical container or capsule.

According to one aspect of the present invention there is provided a method of inserting a cartridge of wound-up photographic film into a container via an open end of the container, where the cartridge has an elongate housing having a central longitudinal axis and where a length of film leader at the free end of the film projects through an outlet of the housing, the method comprising the steps of supplying an empty container to a loading station, supplying a cartridge of wound-up photographic film to the loading station in a position such that it is aligned with the open end of the container, conveying the cartridge of film into the open end of the container whereby an edge of the film leader is brought into engagement with a rim of the open end of the container and, simultaneously with the conveying of the cartridge, rotating one of the cartridge and the container about the longitudinal axis of the cartridge such that the relative movement upon engagement of the film leader with the rim of the container causes the film leader to be wrapped around the housing of the cartridge to permit ready insertion of the cartridge and the film leader into the container.

Preferably it is the cartridge which is rotated about its longitudinal axis such that the engagement of the rotating film leader with the rim of the container causes the film leader to be wrapped around the housing of the cartridge to permit ready insertion of the cartridge and the film leader into the container.

Preferably the method comprises the further step of applying a cap to the open end of the container once the cartridge has been inserted therein.

The step of applying a cap to the container may be a two-stage operation comprising an initial stage in which the cap is brought into engagement with and is supported loosely upon the rim of the open end of the container and a second stage in which the cap is pushed firmly onto the rim of the open end of the container.

The second stage may comprise moving the cap past a spring-loaded roller, the roller engaging the cap and pressing the cap firmly onto the rim of the open end of the container.

Conveniently the method comprises the further step of checking that a cap has been correctly applied to the open end of the container.

Advantageously the method comprises the further step of checking the orientation of an empty container as it is supplied to the loading station to ensure that the open end of the container is directed towards a cartridge of film to be inserted therein.

Preferably the container and the cap are opaque and the entire method is undertaken in a dark room.

According to a second aspect of the invention there is provided an apparatus for inserting a cartridge of wound-up photographic film into a container via an open end of the container, where the cartridge has an elongate housing having a central longitudinal axis and where a length of film leader at the free end of the film projects through an outlet of the housing, the apparatus comprising means for supplying an empty container to a loading station, means for supplying a cartridge of wound-up photographic film to the loading station, means for supporting the cartridge of film in alignment with the open end of the container, means for conveying the cartridge into the open end of the container bringing an edge of the film leader into engagement with a rim of the open end of the container and means for simultaneously rotating one of the cartridge and the container about the longitudinal axis of the cartridge as it passes into the open end of the container such that relative movement upon the engagement of the film leader with the rim of the container causes the film leader to be wrapped around the housing of the cartridge to permit the ready insertion of the cartridge and the film leader into the container.

Preferably the rotating means comprise means for rotating the cartridge about its longitudinal axis such that the engagement of the rotating film leader with the rim of the container causes the film leader to be wrapped around the housing of the cartridge to permit the ready insertion of the cartridge and the film leader into the container.

Preferably the apparatus further comprises means for applying a cap to the open end of the container once the cartridge has been inserted therein.

Conveniently the means for applying a cap to the open end of the container include a roller past which the cap is moved when supported loosely upon a rim of the open end of the container, the engagement of the roller with the cap causing the cap to be pushed firmly onto the rim of the open end of the container.

Advantageously means are provided for checking that a cap has been correctly applied to the container and for causing the container to be represented to the means for applying a cap in the event that it is detected that a cap has not been correctly applied.

Preferably the means for supplying an empty container to a loading station comprise a rotatable wheel defining a plurality of pockets around its periphery, each pocket being designed to receive a single container.

Conveniently the means for supplying a cartridge of photographic film to the loading station comprise a pivotally mounted arm movable between a first position in which it picks up a cartridge of film and a second position in which it delivers the cartridge to the loading station.

Advantageously the free end of the arm includes an arrangement for magnetically supporting the cartridge of film thereon.

The means for supporting the cartridge of film in alignment with the open end of the container may comprise a magnetic support head, the head being positioned at one end of a shaft, the shaft being mounted in the apparatus for rotation about its central longitudinal axis.

Preferably the means for conveying the cartridge into the open end of the container comprise means for moving the shaft with the magnetic support head at one end in a direction axially along its longitudinal axis.

Conveniently the outer periphery of the shaft having the magnetic support head at one end defines a slot, at least part of which is of spiral form, there being a pin fixed on the apparatus, the free end of the pin engaging within the slot defined in the outer periphery of the shaft, the engagement of the pin in the spiral part of the slot causing rotation of the shaft upon axial movement thereof.

Advantageously the apparatus comprises means for checking the orientation of an empty container as it is supplied to the loading station to ensure that the open end of the container is directed towards a cartridge of film to be inserted therein, means being provided for preventing the attempted insertion of a cartridge into a container if it is detected that the container is incorrectly oriented.

BRIEF DESCRIPTION OF THE DRAWINGS

In order that the present invention may be more readily understood and so that further features thereof may be appreciated, the invention will now be described by way of example with reference to the accompanying drawings in which.

DETAILED DESCRIPTION OF THE INVENTION

Figure 1:
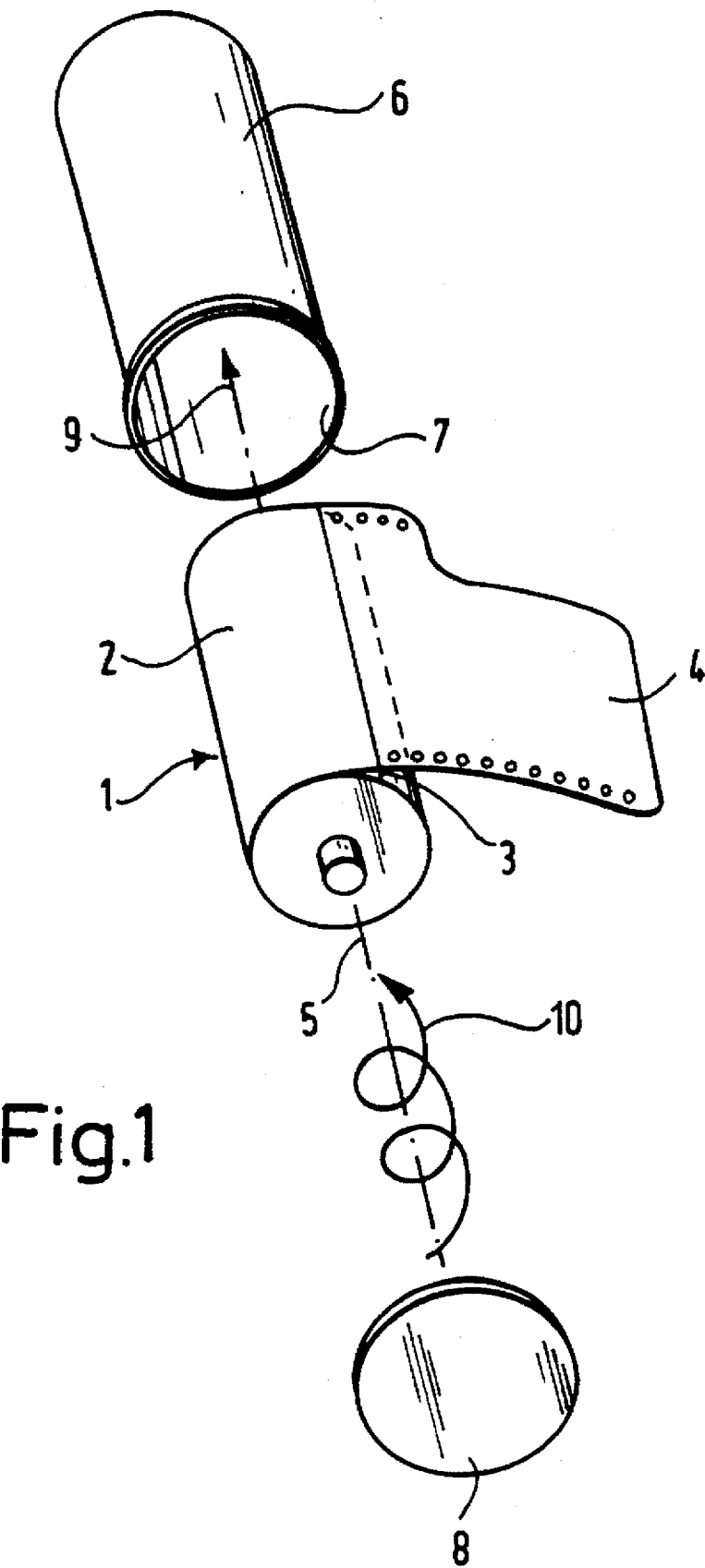
FIG. 1 is a schematic, perspective view of a cartridge of wound-up photographic film being loaded into a cylindrical container, illustrating the principle behind the method of the present invention.

In FIG. 1 of the drawings, a cartridge of wound-up photographic film is designated 1. As mentioned above, the cartridge 1 comprises a spool (not visible) around the shaft of which the film is wound, and an outer cover or housing 2 having a light-proof outlet slot 3 through which the leader portion 4 of the film projects. The cartridge of film has a central longitudinal axis 5. A cylindrical container or capsule 6 is designed to receive the cartridge 1 by way of an open end 7, and a cap 8 is provided which can be snapped onto the open end of the capsule in order to close it. The cartridge of film 1 and the capsule 6 and its cap 8 are of a known form, the film being a conventional 35 mm film and the capsule and cap typically being formed as plastics mouldings, such that the cap will snap onto the open end 7 of the capsule. The capsule 6 is, of course, slightly longer and of slightly greater diameter than the cartridge 1. The film cartridge 1 will not readily pass into the capsule 6 in the axial direction shown by arrow 9 when the leader portion 4 of the film projects from the slot 3 in the cover 2 in the manner as shown in FIG. 1.

It has been discovered that if the cartridge is rotated about its longitudinal axis as shown by the arrow 10, at the same time as being moved axially in the direction of arrow 9, the rim of the open end 7 of the capsule 6 can be used as a guide which will engage and wrap the film leader 4 around the body 2 of the cartridge 1 as the cartridge passes into the capsule. Thus, the simultaneous rotation and axial movement of the cartridge enables it to be inserted into the capsule in a single operation without the need for any separate means (other than the capsule itself) for guiding the film leader around the body of the cartridge to prevent any significant damage to the film during the loading operation. It would be possible to rotate the container instead of the cartridge so that at the point where the cartridge enters the capsule there is relative rotational movement between the cartridge and the capsule about the longitudinal axis of the cartridge.

Figure 2:
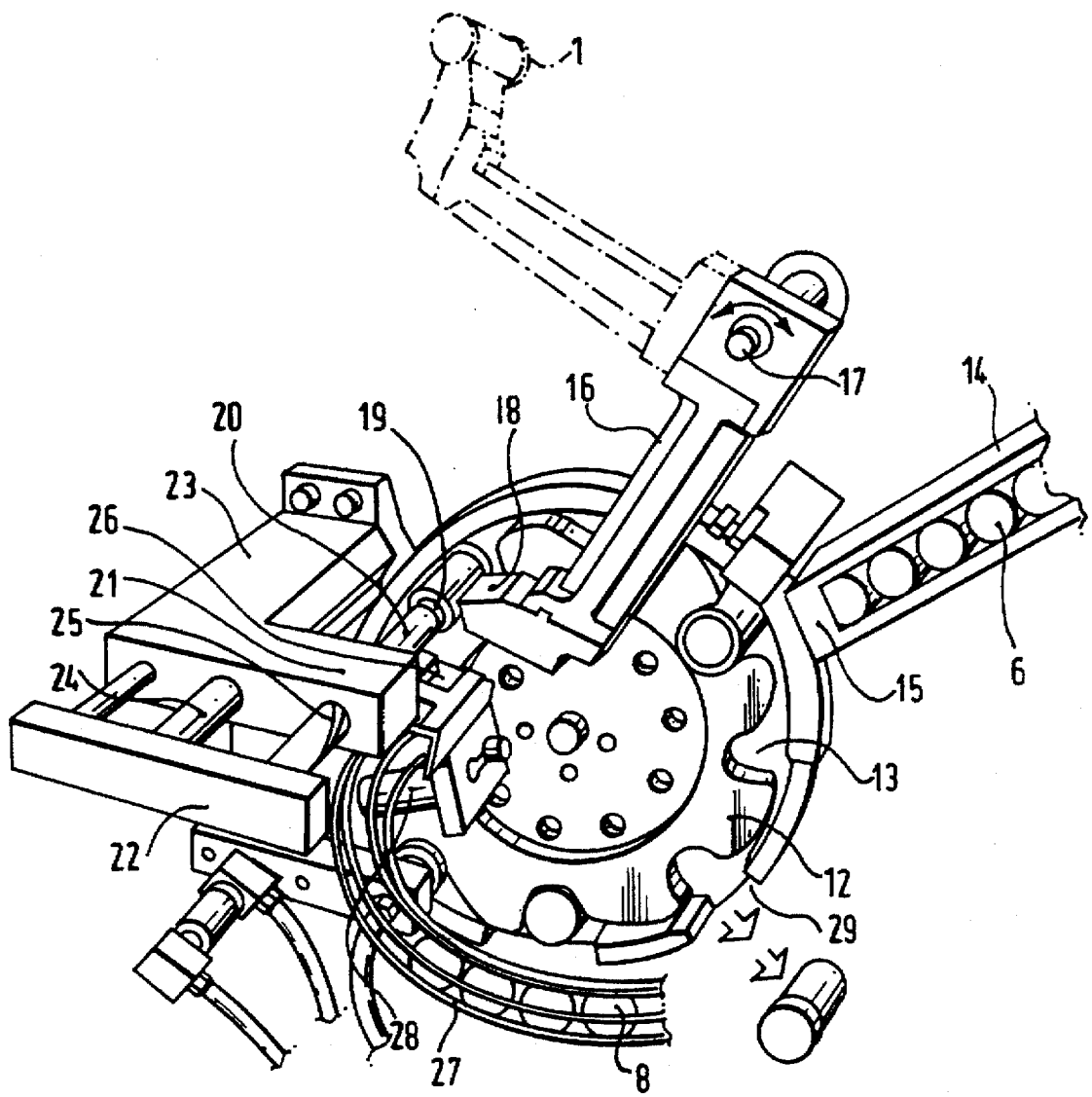
FIG. 2 is a schematic, perspective view of an apparatus for inserting the cartridge of film into the container.

FIG. 2 illustrates one possible example of an apparatus for implementing the method of loading the film cartridge into the capsule as described above. The apparatus comprises a central, rotatably mounted thick disc or wheel 12 defining a plurality of equally spaced pockets 13 around its periphery. Each pocket 13 is dimensioned to receive one capsule 6. A storage and conveyance chute 14 is located at the 2 o'clock position with respect to the wheel 12 and receives a supply of empty capsules 6, each of which should be facing the same direction. The chute 14 is inclined so that the cylindrical capsules roll down to an outlet at the lower end of the churn adjacent the periphery of the wheel 12, where outlet control means 15 permit a single capsule to pass out into each pocket 13.

The wheel 12 is rotated in an anti-clockwise direction as seen in FIG. 2, by means of, for example, a stepping motor or the like so that for each step of the motor the next pocket 13 is aligned with the outlet of the capsule chute 14.

An elongate swinging arm 16 is pivotally mounted for rotation about the axis of a shaft 17 located at a position above the main wheel 12. The free end of the arm 16 is provided with a projecting foot 18 incorporating a magnetic arrangement by way of which the foot 18 can pick-up a cartridge of film 6 from an elevated position (shown in dotted lines in FIG. 2) and convey it to the position shown in full lines where the cartridge 6 is located at approximately the 10 o'clock position with respect to the wheel 12. The swinging arm 16 may be rotated between the raised and lowered positions by means of any appropriate drive.

At the 10 o'clock position the cartridge 1 of wound film is picked up by a magnetic supporting head 19 which removes the cartridge from the foot 18 of the swinging arm 16. The magnetic supporting head 19 engages one end flange of the spool of the cartridge 1, the flange being formed of a ferro-magnetic material.

The magnetic supporting head 19 is located upon the end of a shaft 20. The shaft 20 is supported by a first mounting block 21 and is mounted in bearings in a second mounting block 22 so as to be rotatable about its central longitudinal axis.

The magnetic supporting head 19 holds the cartridge 1 in alignment with the open end of an empty capsule 6 and is movable in the axial direction of the cartridge 1 (also being the axial direction of the cylindrical container or capsule 6 and the direction indicated by arrow 9 in FIG. 1) under the action of a pneumatic or other actuator arrangement accommodated adjacent a portion 23 of the mounting block 21. The actuator arrangement includes a shaft 24 which connects with the mounting block 22 which in turn transmits axial movement to the shaft 20 and the supporting head 19. A further, lay shaft extends between the mounting block 22 and the portion 23 of the mounting block 21. The axial movement of the cartridge when supported by the magnetic head takes it towards the empty capsule 6.

At a position intermediate the location where the capsule 6 enters a pocket 13 in the wheel 12 and the 10 o'clock position where a cartridge of film 1 is to be inserted into the capsule 6, the apparatus includes sensor means for checking that the capsule 6 is correctly oriented within the pocket 13, that is to say to check that the capsule is oriented with its open end presented towards the cartridge of film 1. The apparatus includes a central control unit which, in the event of the capsule 6 being incorrectly oriented, will prevent a cartridge of film 1 from being moved towards the capsule at the 10 o'clock position.

The outer periphery of the shaft 20 is formed with a slot 25 at least part of which is of spiral form, somewhat in the manner of a screw-thread, within which a pin which is fixed to the mounting block 21 (and not visible in the drawing) is received. As the shaft 20 moves the cartridge 1 towards the capsule 6 the engagement of the pin in the slot 25 imparts a rotational movement to the shaft 20 and thus to the cartridge (about its longitudinal axis 5) so that the cartridge is rotating slowly just as it reaches the open end 7 of the capsule 6. The edge of the film leader 4 then engages the rim of the open end of the capsule 6 which acts as a guide to wrap the film leader around the body 2 of the cartridge as it passes into the capsule. The fact that the film leader is rotating as it engages the rim of the container ensures that it is automatically wrapped around the body of the cartridge.

In addition the head 19 is offset slightly from the central axis of the shaft 20 so that as the cartridge 1 approaches the empty capsule 6 there is maximum clearance on that side of the cartridge from which the leader 4 projects. It is to be appreciated that the cartridge 1 initially moves linearly as it approaches the capsule 6 and is rotated just at the point of entry into the capsule. The magnetic supporting head 19 is now retracted and a simultaneous blast of compressed air down the centre of the support head mechanism strips the cartridge 1 from the head 19 leaving the cartridge within the capsule 6. The swinging arm 16 is now moved to the raised position to collect the next cartridge.

The capsule 6, containing the cartridge 1, is moved, by rotation of the wheel 12, to the 9 o'clock position where a cap loading head 26 positions a cap 8 in alignment with the open end 7 of the capsule. A supply of caps 8 is conveyed to the cap loading head 19 by way of a rack or the like 27. Each cap 8 defines an annular recess or the like designed to receive the rim of the open end of the capsule. At the cap loading head 26, the capsule 6 is driven (by any appropriate means) into engagement with the cap such that the recess in the cap and the rim of the capsule 6 are brought together. The cap is now loosely supported upon the open end 7 of the capsule 6 and further rotation of the wheel 12 moves the cap past a spring-loaded roller 28 which firmly presses or "snaps" the cap 8 onto the end of the capsule 6.

Continued rotation of the wheel 12 carries the now capped capsule around the inside of a casing surrounding the wheel 12. The capsule moves past an arrangement for checking that a cap 8 has been applied to the capsule, the arrangement comprising a spring loaded cam which engages the cap at the lowest point in the circular path followed by the capsules. If the arrangement detects that no cap has been applied to the capsule then the capsule is retained within the wheel 12 for one further complete rotation of the wheel in order for a cap to be applied. In such circumstances the central control unit prevents the apparatus from seeking to insert another capsule 6 into the pocket 13 which is occupied by the uncapped capsule and prevents any attempt from being made to insert a further cartridge of film into that capsule. Upon reaching an outlet opening 29 in the casing surrounding the wheel 12 a correctly capped capsule containing the film cartridge is ejected from the apparatus.

It will be appreciated that the wheel 12 defines a plurality of pockets 13. Where there are, for example, eight pockets, one rotation of the wheel 12 will result in the loading and capping of eight capsules 6. The apparatus is particularly compact and may be accommodated within a space of only approximately 305 mm×305 mm×152 mm (12"×12"×6") which represents a significant saving in space compared with existing apparatus available to accomplish the same task. The reduced size of the apparatus makes it practical for the inserting of the cartridge into a container and the capping of the container to be undertaken in a dark room. Thus the entire process of assembling the film cartridge and putting it in a closed container can be done in the dark room. Where the container and cap are opaque the film leader will remain unexposed. It is the practice of some people to load a film into a camera within a darkened environment, such as a black bag provided with elasticated cuffs especially for this purpose. In this case the entire length of film, including the leader portion, will be available for use since the leader portion will not have been exposed during the insertion of the film into a container or dining loading of the film into the camera. This can give the end customer several additional frames or pictures from the film, compared with a film where the leader has been exposed prior to loading in the camera.

The use of the rim of the capsule 6 as a guide for wrapping the film leader 4 around the cartridge means that a new film guide is provided for every cartridge during loading which results in improved quality of film leader, since there is no handling of this part of the film by separate mechanisms and guides during loading of the film into the cartridge. The apparatus for, and method of, loading are simple and effective and improve the productivity rate for the production of containerized film cartridges and permit the loading and capping of the capsules in one compact apparatus. The checks which are made to ensure that the capsules are correctly oriented prior to loading and to ensure that the capsules are correctly capped, together with the central control unit, reduce the mean time between failures of the apparatus.

We claim:

1. A method of inserting a cartridge of wound-up photographic film into a container via an open end of the container, where the cartridge has an elongate housing having a central longitudinal axis and where a length of film leader at a free end of the film projects through an outlet of the housing, the method comprising the steps of supplying an empty container to a loading station, supplying a cartridge of wound-up photographic film to the loading station in a position such that it is aligned with the open end of the container, conveying the cartridge of film into the open end of the container whereby an edge of the film leader is brought into engagement with a rim of the open end of the container and, simultaneously with the conveying of the cartridge, rotating one of the cartridge or the container about the longitudinal axis of the cartridge such that relative movement upon engagement of the film leader with the rim of the container causes the film leader to be wrapped around the housing of the cartridge to permit ready insertion of the cartridge and the film leader into the container.

2. A method according to claim 1 wherein the cartridge is rotated about its longitudinal axis such that the engagement of the rotating film leader with the rim of the container causes the film leader to be wrapped around the housing of the cartridge to permit ready insertion of the cartridge and the film leader into the container.

3. A method according to claim 1, wherein the method comprises the further step of checking the orientation of an empty container as it is supplied to the loading station to ensure that the open end of the container is directed towards a cartridge of film to be inserted therein.

4. A method according to claim 1, wherein the method comprises the further step of applying a cap to the open end of the container once the cartridge has been inserted therein.

5. A method according to claim 4, wherein the step of applying a cap to the container is a two-stage operation comprising an initial stage in which the cap is brought into engagement with and is supported loosely upon the rim of the open end of the container and a second stage in which the cap is pushed firmly onto the rim of the open end of the container.

6. A method according to claim 5, wherein the second stage comprises moving the cap past a spring-loaded roller, the roller engaging the cap and pressing the cap finely onto the rim of the open end of the container.

7. A method according to claim 4, wherein the method comprises the further step of checking that a cap has been correctly applied to the open end of the container.

8. A method according to claim 3, wherein the container and the cap are opaque and the entire method is undertaken in a dark room.

9. An apparatus for inserting a cartridge of wound-up photographic film into a container via an open end of the container, where the cartridge has an elongate housing having a central longitudinal axis and where a length of film leader at a free end of the film projects through an outlet of the housing, the apparatus comprising means for supplying an empty container to a loading station, means for supplying a cartridge of wound-up photographic film to the loading station, means for supporting the cartridge of film in alignment with the open end of the container, means for conveying the cartridge into the open end of the container bringing an edge of the film leader into engagement with a rim of the open end of the container and means for simultaneously rotating one of the cartridge or the container about the longitudinal axis of the cartridge as it passes into the open end of the container such that relative movement upon the engagement of the film leader with the rim of the container causes the film leader to be wrapped around the housing of the cartridge to permit ready insertion of the cartridge and the film leader into the container.

10. An apparatus according to claim 9, wherein the rotating means comprise means for rotating the cartridge about its longitudinal axis such that the engagement of the rotating film leader with the rim of the container causes the film leader to be wrapped around the housing of the cartridge to permit the ready insertion of the cartridge and the film leader into the container.

11. An apparatus according to claim 9, wherein the apparatus further comprises means for applying a cap to the open end of the container once the cartridge has been inserted therein.

12. An apparatus according to claim 11, wherein the means for applying a cap to the open end of the container include a roller past which the cap is moved when supported loosely upon a rim of the open end of the container, engagement of the roller with the cap causing the cap to be pushed firmly onto the rim of the open end of the container.

13. An apparatus according to claim 11, wherein means are provided for checking that a cap has been correctly applied to the container and for causing the container to be represented to the means for applying a cap in the event that it is detected that a cap has not been correctly applied.

14. An apparatus according to claim 9, wherein the means for supplying an empty container to a loading station comprise a rotatable wheel defining a plurality of pockets around its periphery, each pocket being designed to receive a single container.

15. An apparatus according claim 9, wherein the means for supplying a cartridge of photographic film to the loading station comprise a pivotally mounted arm movable between a first position in which it picks up a cartridge of film and a second position in which it delivers the cartridge to the loading station.

16. An apparatus according to claim 15, wherein a free end of the arm includes an arrangement for magnetically supporting the cartridge of film thereon.

17. An apparatus according to claim 9, wherein the means for supporting the cartridge of film in alignment with the open end of the container comprise a magnetic support head, the head being positioned at one end of a shaft, the shaft being mounted in the apparatus for rotation about its central longitudinal axis.

18. An apparatus according to claim 17 wherein the means for conveying the cartridge into the open end of the container comprise means for moving the shaft with the magnetic support head at one end in a direction axially along its longitudinal axis.

19. An apparatus according to claim 17, wherein an outer periphery of the shaft having the magnetic support head at one end defines a slot, at least part of which is of spiral form, there being a pin fixed on the apparatus, a free end of the pin engaging within the slot defined in the outer periphery of the shaft, the engagement of the pin in the spiral part of the slot causing rotation of the shaft upon axial movement thereof.

20. An apparatus according to claim 9, wherein the apparatus comprises means for checking the orientation of an empty container as it is supplied to the loading station to ensure that the open end of the container is directed towards a cartridge of film to be inserted therein, means being provided for preventing the attempted insertion of a cartridge into a container if it is detected that the container is incorrectly oriented.

* * * * *

UNITED STATES PATENT AND TRADEMARK OFFICE
CERTIFICATE OF CORRECTION

PATENT NO. : 5,669,205
DATED : September 23, 1997
INVENTOR(S) : Joseph Rice, et al It is certified that error appears in the above-indentified patent and that said Letters Patent is hereby corrected as shown below:

Column 7, line 46, "pressing the cap finely onto" should read
--pressing the cap firmly onto--.

Signed and Sealed this

Twenty-third Day of December, 1997

Attest:

BRUCE LEHMAN

Attesting Officer

Commissioner of Patents and Trademarks